United States Patent
Nandagopal et al.

(10) Patent No.: US 9,125,147 B2
(45) Date of Patent: Sep. 1, 2015

(54) SYSTEM AND METHOD FOR PROVIDING COMMUNICATION SERVICES

(75) Inventors: Thyaga Nandagopal, Edison, NJ (US); Ajay Sathyanath, Edison, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 89 days.

(21) Appl. No.: 13/115,519

(22) Filed: May 25, 2011

(65) Prior Publication Data
US 2012/0300647 A1 Nov. 29, 2012

(51) Int. Cl.
*H04W 48/20* (2009.01)
*H04L 12/26* (2006.01)
*H04W 24/02* (2009.01)

(52) U.S. Cl.
CPC .......... *H04W 48/20* (2013.01); *H04L 43/0882* (2013.01); *H04L 43/0894* (2013.01); *H04W 24/02* (2013.01)

(58) Field of Classification Search
CPC .. H04W 48/20; H04W 24/02; H04L 43/0882; H04L 43/0894
See application file for complete search history.

(56) References Cited

U.S. PATENT DOCUMENTS

| | | | |
|---|---|---|---|
| 6,539,230 B2 | 3/2003 | Yen | |
| 6,970,714 B2 | 11/2005 | D'Souza et al. | |
| 2005/0030922 A1* | 2/2005 | Lee et al. | 370/331 |
| 2005/0070293 A1 | 3/2005 | Tsukiji et al. | |
| 2005/0141468 A1* | 6/2005 | Kim et al. | 370/338 |
| 2010/0165863 A1 | 7/2010 | Nakata | |
| 2010/0172234 A1* | 7/2010 | Thesling | 370/206 |
| 2011/0158193 A1* | 6/2011 | Weizman | 370/329 |
| 2011/0223927 A1* | 9/2011 | Seo et al. | 455/450 |
| 2012/0157082 A1* | 6/2012 | Pedersen et al. | 455/422.1 |
| 2012/0327888 A1* | 12/2012 | Sankar et al. | 370/329 |

FOREIGN PATENT DOCUMENTS

| | | |
|---|---|---|
| JP | 2000295664 A | 10/2000 |
| JP | 2005057728 A | 3/2005 |
| WO | WO2008122754 | 10/2008 |

OTHER PUBLICATIONS

Adhicandra, Iwan, "Adaptive Subframe Allocation in WiMAX Networks", Proceedings of 33$^{rd}$ International Conference on Tellecommunications and Signal Processing (TSP 2010), ISBN 978-963-88981-0-4, pp. 358-362, Aug. 17-20, 2010.*

Chiang, Chih-He, et al., "Adaptive Downlink and Uplink Channel Split Ratio Determination for TCP-Based Best Effort Traffic in TDD-Based WiMAX Networks", IEEE Journal on Selected Areas in Communications, vol. 27, No. 2, pp. 182-190, Feb. 2009.*

(Continued)

*Primary Examiner* — Alpus H Hsu
*Assistant Examiner* — Walter Divito
(74) *Attorney, Agent, or Firm* — Chiesa Shahinian & Giantomasi PC

(57) ABSTRACT

A method for determining a load measure associated with a wireless communications node, such as a Wi-Fi access point or cellular base station, is described. A time interval measure representing a time interval between frames transmitted by a node is determined, and a number of user devices associated with the node is determined based on information in the frames transmitted by the node. A load measure associated with the node is determined, based at least on the number of user devices associated with the node and the time interval measure. Systems and apparatus are also described.

25 Claims, 5 Drawing Sheets

(56) References Cited

OTHER PUBLICATIONS

International Search Report from PCT/US2012/038926 filed May 22, 2012.
Written Opinion from PCT/US2012/038926 filed May 22, 2012.
Lan Wang et al, "Integration of SNR, Load and Time in Handoff Initiation for Wireless LAN", Personal, Indoor and Mobile Radio Communications, 2003, PIMRC 2003. 14th IEEE Proceedings on Sep. 7-10, 2003, IEEE, Piscataway, NJ, USA, vol. 2, Sep. 7, 2003 pp. 2032-2036.
Notice of Reasons for Refusal mailed on Oct. 21, 2014, and received on Dec. 17, 2014, in connection with related Japanese patent application No. 2014-512939, 4 pgs.

* cited by examiner

SYSTEM AND METHOD FOR PROVIDING COMMUNICATION SERVICES

TECHNICAL FIELD

This invention relates generally to systems and methods for providing communication services, and more particularly to systems and methods for providing wireless communication services.

BACKGROUND

Wireless communication systems are well-known and in widespread use. Wireless fidelity (Wi-Fi) communication networks typically include a plurality of access points that provide connectivity within a close range of each Wi-Fi access point. Cellular communication networks typically include a plurality of base stations geographically located to serve corresponding regions or cells. Some mobile stations such as wireless phones, personal digital assistants, and laptop computers have the capability of communicating via a cellular network, a Wi-Fi network, or both.

Regardless of the wireless technology that is used, a user's experience in communicating via a wireless communication system is affected by the amount of available bandwidth. Current methods for determining the available bandwidth at a node (an access point or base station) can be time consuming. For example, in some communication systems it is necessary for a user device to communicate with a central server and request information concerning the available bandwidth at various nodes within the system.

SUMMARY OF THE INVENTION

In accordance with an embodiment, a method for determining a load measure associated with a wireless communications node is provided. The method may be performed by a communication device such as a mobile phone or other device having wireless communications capability, for example. A time interval measure representing a time interval between frames transmitted by a node is determined, and a number of user devices associated with the node is determined based on information in the frames transmitted by the node. A load measure associated with the node is determined, based at least on the number of user devices associated with the node and the time interval measure.

In one embodiment, the node is a Wi-Fi access point. A user device enters a mode enabling receipt of any frame transmitted via a selected channel. A frame is received via the selected channel, and the access point is identified based on information in the frame received via the selected channel. One or more addresses are identified based on information in the frames transmitted by the access point, and a number of user devices associated with the access point is determined based on the addresses. The load measure is determined by dividing the number of user devices associated with the access point by the time interval measure.

In one embodiment, the user device examines frames transmitted by the access point via the selected channel during a predetermined period of time. The time interval measure may represent an average time interval between the frames transmitted by the node during the predetermined period of time.

The steps of determining a time interval measure, determining a number of user devices, and determining a load measure may be repeated for a second access point associated with the selected channel. A second access point associated with a second channel may be identified, and the steps of determining a time interval measure, determining a number of user devices, and determining a load measure, may be repeated for the second access point.

In another embodiment, the node is a cellular base station. A subframe utilization value representing a rate of utilization of subframes within the frames transmitted by the base station is determined. A load measure associated with the base station is determined based on the number of user devices associated with the base station, the time interval measure, and the subframe utilization value. The steps of determining a time interval measure, determining a number of user devices, determining a subframe utilization value, and determining a load measure may be repeated for a second base station.

In another embodiment, respective load measures may be determined for one or more access points and for one or more base stations. A node having a lowest load measure is selected, and the user device may join or connect to the selected node. Alternatively, information identifying the various nodes and corresponding load measures may be displayed to a user, and the user may be provided an option to select a desired node. When a selection of a node is received from the user, the user device joins or connects to the selected node.

These and other advantages of the present disclosure will be apparent to those of ordinary skill in the art by reference to the following Detailed Description and the accompanying drawings.

DETAILED DESCRIPTION

Figure 1:
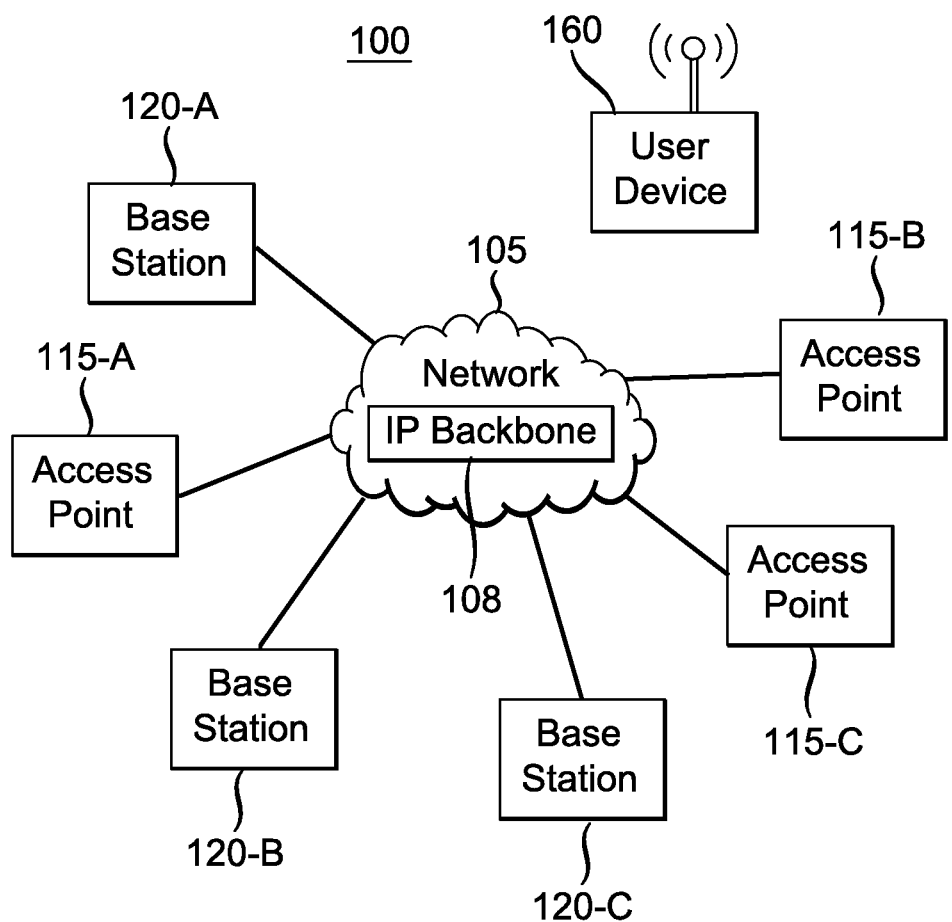
FIG. 1 shows a communication system that may be used to provide communication services in accordance with an embodiment.

FIG. 1 shows a communication system 100 in accordance with an embodiment of the invention. Communication system 100 comprises a network 105, a plurality of access points 115-A, 115-B, 115-C, and a plurality of base stations 120-A, 120-B, 120-C. A user device such as user device 160 shown in FIG. 1 may use communication system 100 to achieve wireless connectivity in order to conduct communications with another device (not shown).

In the embodiment of FIG. 1, network 105 comprises an Internet Protocol (IP) backbone 108 through which data is transmitted. Network 105 may be connected to other networks, such as an optical network. Network 105 may be the Internet, for example. In other embodiments, network 105 may comprise one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

In the illustrative embodiment of FIG. 1, each access point 115 provides a wireless local area network (WLAN) in a local area in the vicinity of the access point, in compliance with the Wi-Fi standards provided by the Wi-Fi alliance. The WLANs of two access points 115 may overlap. Accordingly, an access point 115 may provide wireless connectivity to a user device 160 in accordance with the Wi-Fi protocol. Use of access points and use of Wi-Fi protocols are known.

Base stations 120 may provide to user device 160 wireless connectivity for cellular communications according to any one of a variety of protocols, such as a code division multiple access (CDMA, CDMA200) protocol, a wideband-CDMA (WCDMA) protocol, a Universal Mobile Telecommunications System (UMTS) protocol, a Global System for Mobile Telecommunications (GSM) protocol, etc. Other protocols for cellular communications may be used. For example, other 3G protocols may be used. Use of base stations and use of cellular communications protocols are known.

Figure 2:
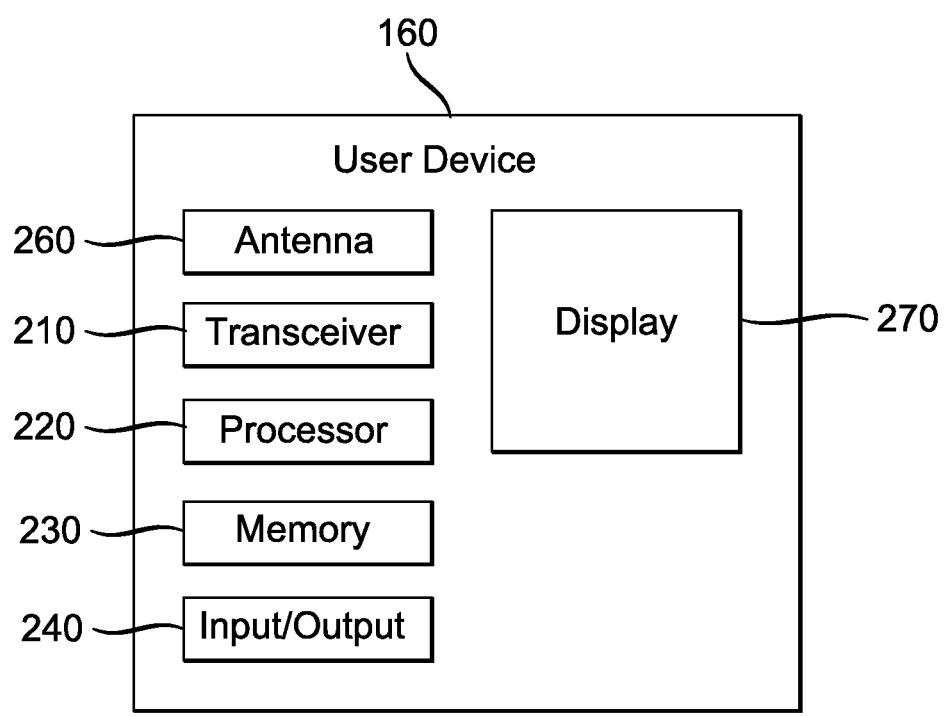
FIG. 2 shows functional components of an exemplary user device.

User device 160 may be any device that enables a user to communicate wirelessly via network 105. FIG. 2 shows functional components of an exemplary user device 160. User device 160 comprises a transceiver 210, a processor 220, a memory 230, input/output devices 240, an antenna 260, and a display 270.

Transceiver 210 sends and receives signals via antenna 260. The overall functioning of user device 160 is controlled by processor 220, which operates by executing computer program instructions which are stored in memory 230 and loaded into memory 230 when execution of the computer program instructions is desired. These computer program instructions define the overall operation of user device 160. Thus, the method steps that are described below and outlined in FIG. 5, for example, can be defined by the computer program instructions stored in the memory 230 and controlled by the processor 220 executing the computer program instructions. For example, the computer program instructions can be implemented as computer executable code programmed by one skilled in the art to perform an algorithm defined by the method steps that are described below and outlined in FIG. 5, for example. Accordingly, by executing the computer program instructions, the processor 220 executes an algorithm defined by the method steps that are described below and outlined in FIG. 5, for example.

Memory 230 may comprise any data storage device adapted to storing data, such as random access memory (RAM), read only memory (ROM), one or more disk drives, magnetic disk, CD ROM, or other computer readable medium. Memory 230 may also store other data which may be necessary for the operation of user device 160. In addition, memory 230 has at least a portion of which is non-volatile, such that the information contained therein remains after power to user device 160 is turned off. Although FIG. 2 shows memory 230 as one component, memory 230 may be implemented with separate memory units.

Display 270 may display images, text, Web pages, and other information to a user. For example, display 270 may be a liquid crystal display (LCD) screen of a mobile telephone. Input/output devices 240 receive various types of information from users and/or from the environment, and transmit information to users. For example, input/output devices 240 may include a keypad, one or more microphones, one or more audio speakers, etc. User device 160 may include other components not shown in FIG. 2.

It is to be understood that FIG. 2 is for illustrative purposes only. The design and operation of wireless devices are well known in the art and various modifications are possible. For example, user device 160 may be a wireless communication device such as a mobile phone, a personal digital assistant, etc. Alternatively, user device 160 may be a personal computer, a laptop computer, a workstation, a mainframe computer, etc. with wireless communication capability. Other devices may be used.

Figure 3A:
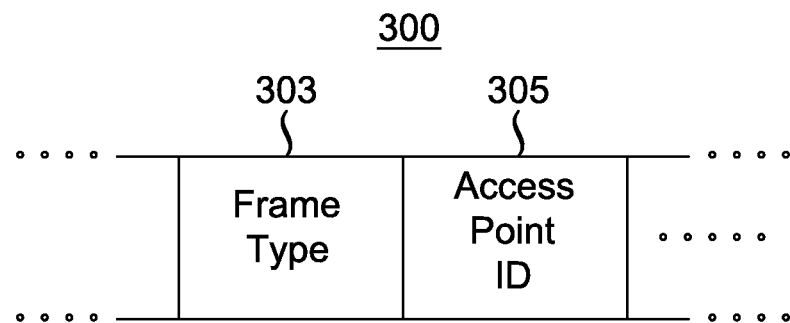
FIG. 3A shows an exemplary beacon frame transmitted by a Wi-Fi access point.

In accordance with Wi-Fi standards, each access point 115 from time to time transmits a data packet referred to as a frame. FIG. 3A shows an exemplary Wi-Fi frame 300 referred to as a beacon frame. Beacon frame 300 comprises multiple fields containing various types of data, including a FRAME TYPE field 303, which contains information indicating that the frame is a beacon frame, and an ACCESS POINT ID field 305, which includes information identifying the particular access point 115 that transmitted the frame.

Figure 3B:
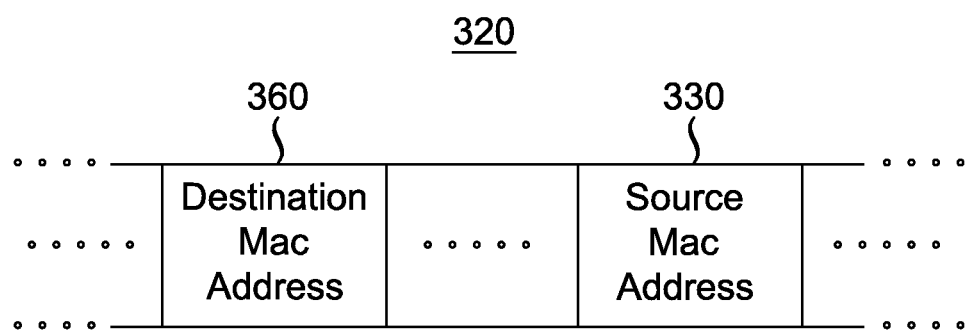
FIG. 3B shows an exemplary frame transmitted by a Wi-Fi access point.

Each Wi-Fi access point 115 may also from time to time transmit other types of frames, which may have a structure similar to that of frame 320 shown in FIG. 3B. Frame 320 comprises multiple fields including a SOURCE MAC ADDRESS field 330 and a DESTINATION MAC ADDRESS field 360. SOURCE MAC ADDRESS field 330 includes information identifying the access point that transmits the frame. DESTINATION MAC ADDRESS field 360 includes information identifying a user device to which the frame is directed.

Figure 4A:
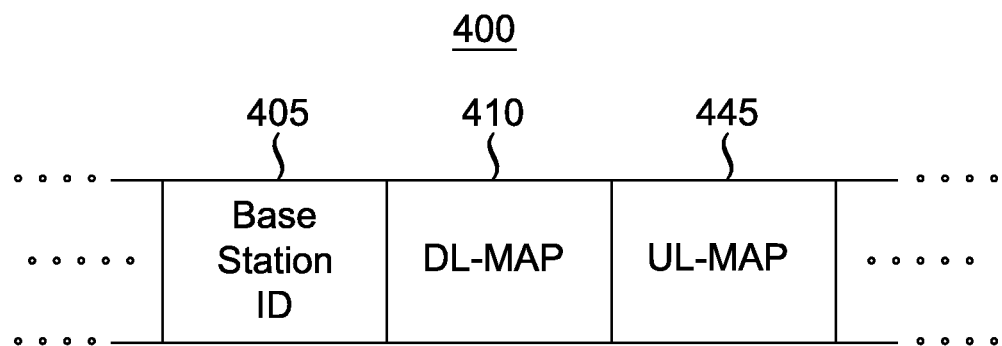
FIG. 4A shows an exemplary cellular frame transmitted by a cellular base station.
Figure 4B:
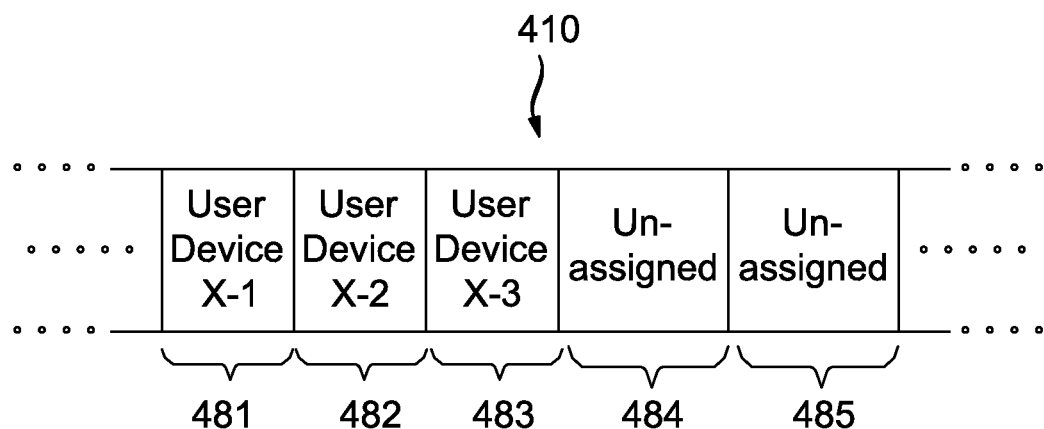
FIG. 4B shows several subframes within an exemplary DL-MAP field of a cellular frame.

In accordance with existing cellular standards, each base station 120 uses a defined channel, referred to as a common control channel, to communicate certain information to user devices that are currently using the base station. Each base station also uses a downlink data control channel to transmit information to various user devices, and an uplink data control channel to receive information from user devices. From time to time, each base station 120 transmits via the common control channel a cellular frame containing various types of information, including information indicating the assignment of time slots in a subsequent frame to be transmitted via the downlink data control channel, and information indicating the assignment of time slots in the uplink data control channel. FIG. 4A is an example of an exemplary cellular frame 400 that may be transmitted by a base station 120. Frame 400 comprises BASE STATION ID field 405, containing information identifying the base station that transmits the cellular frame, a downlink map (DL-MAP) field 410, and an uplink map (UL-MAP) field 445. DL-MAP field 410 comprises a plurality of subframes, as shown in FIG. 4B. In the illustrative embodiment of FIG. 4B, subframes 481-485 contain information indicating the assignment of time slots in a subsequent frame to be transmitted via the downlink data control channel. Specifically, subframe 481 contains information indicating that a corresponding subchannel in a subsequent frame will contain information directed to user device X-1; subframe 482 contains information indicating that a corresponding subchannel in the subsequent frame will contain information directed to user device X-2; subframe 483 contains information indicating that a corresponding subchannel in the subsequent frame will contain information directed to user device X-3. Subframes 484 and 485 indicate that corresponding subchannels in the subsequent frame are unassigned.

UL-MAP field 445 has a structure similar to that of DL-MAP field 410. Accordingly, UL-MAP field 445 comprises a plurality of subframes containing information indicating the assignment of time slots in the uplink data control channel.

In accordance with an embodiment, user device 160 may identify a plurality of nodes which may be used to achieve wireless connectivity within communication system 100, and determine a load measure associated with each node. As used herein, the meaning of the term node encompasses an access point, such as an access point 115, and a base station, such as a base station 120.

In a first embodiment, user device 160 may identify one or more access points 115 and determine a load measure associated with each access point. In another embodiment, user device 160 may identify one or more base stations 120 and determine a load measure associated with each base station. Alternatively, user device 160 may identify one or more access points 115 and one or more base stations 120, and determine a load measure associated with each access point and a load measure associated with each base station.

Suppose that a user wishing to employ user device 160 to make a telephone call turns on user device 160. After being turned on, user device 160 enters a promiscuous mode in accordance with Wi-Fi standards. The promiscuous mode enables user device 160 to receive certain types of information via particular Wi-Fi channels. For example, a user device 160 in promiscuous mode may receive any frame transmitted by an access point via a selected Wi-Fi channel. In the illustrative embodiment, user device 160 stores information defining channels associated with the Wi-Fi protocol. For example, user device 160 may include a Wi-Fi card holding information that defines thirteen channels associated with the 802.11g Wi-Fi protocol.

User device 160 accesses a selected Wi-Fi channel and monitors the information being transmitted via the channel. In the illustrative embodiment, one or more frames are received by user device 160, for example, by antenna 260. In a well-known manner, user device 160 identifies a beacon frame transmitted by an access point, such as beacon frame 300, examines ACCESS POINT ID field 305 in the beacon frame, and identifies the access point.

After identifying an access point 115, user device 160 monitors the selected channel and receives a plurality of other frames transmitted by the access point. User device 160 may receive frames similar to frame 320 of FIG. 3B, for example. In one embodiment, user device 160 monitors the selected channel during a predetermined time period T and detects any frames transmitted by the access point during the period. T may be a predetermined number of milliseconds, for example.

Figure 5:
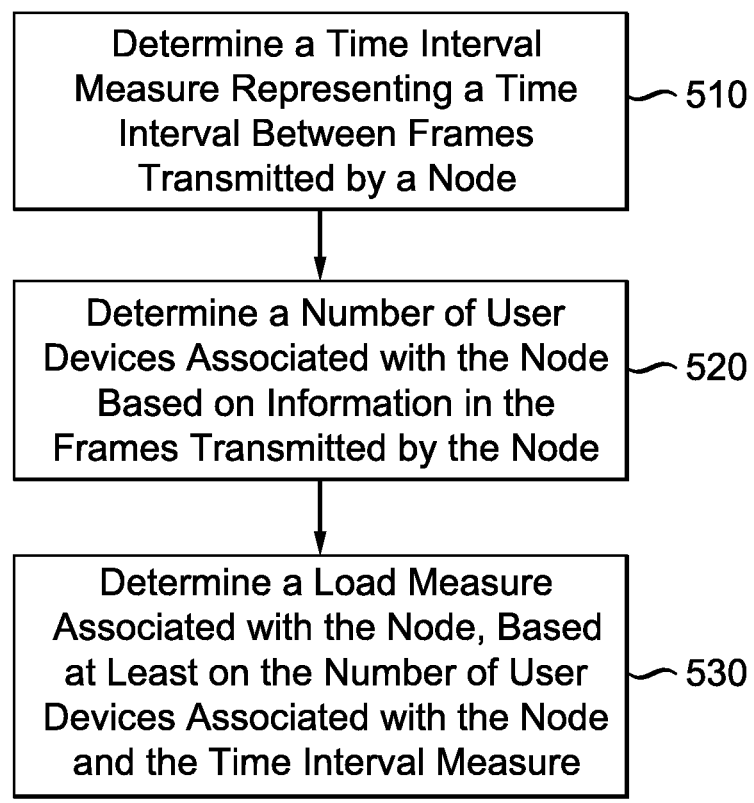
FIG. 5 is a flowchart of a method for determining a load measure associated with a node in accordance with an embodiment.

Based on information in the frames received, user device 160 determines a load measure associated with the access point. FIG. 5 is a flowchart of a method for determining a load measure associated with a node in accordance with an embodiment.

At step 510, a time interval measure representing a time interval between frames transmitted by a node is determined. Accordingly, processor 220 (of user device 160) may receive two frames from the access point 115 and determine the time interval between the two frames. In accordance with an embodiment, user device 160 examines a plurality of frames transmitted by an access point 115 during the predetermined time interval T, and determines an average time interval measure $I_{ave}$ representing an average time interval between successive frames.

At step 520, a number of user devices associated with the node is determined based on information in the frames received from the access point. Referring to FIG. 3B, processor 220 may examine DESTINATION MAC ADDRESS field 360 in each of the frames received from the access point; based on the destination MAC address information obtained in this manner, user device 160 determines a number of unique user devices that are currently using the access point.

At step 530, a load measure associated with the node is determined, based on the number of user devices associated with the node and the time interval measure. In the illustrative embodiment, processor 220 calculates a load measure associated with the access point based on the average time interval $I_{ave}$ between frames received and the number of unique user devices $N_U$ associated with the particular access point, in accordance with the following formula:

Access Point Load=$N_U/I_{ave}$

In accordance with an embodiment, user device 160 uses the methods described above to determine a respective load measure for each a plurality of access points 115. User device 160 selects an access point 115 having the lowest load measure, and joins the selected access point 115. In this manner, user device 160 provides optimal Wi-Fi connectivity capability to the user.

In accordance with another embodiment, user device 160 uses the methods described above to determine respective load measures for a plurality of access points and identifies the access points and the respective load measures to the user, for example, on display 270 (shown in FIG. 2). User device 160 may then allow the user to select an access point from among the access points presented. When a selection of an access point is received from the user, user device 160 joins the selected access point.

In another embodiment, user device 160 identifies one or more base stations 120 and determines a load measure for each base station 120 using the methods described above. This embodiment is discussed below with reference to the method steps presented in FIG. 5.

User device 160 monitors one or more cellular channels, and receives a plurality of cellular frames transmitted by a base station 120. In the illustrative embodiment, cellular frames are received via antenna 260, for example. Processor 220 identifies the corresponding base station based on information in the cellular frames. For example, processor 220 may examine information in BASE STATION ID field 405 in a cellular frame to identify a base station 120.

User device 160 continues to receive frames from the identified base station 120, and determines a time interval measure representing a time interval between cellular frames received from the base station 120 (step 510). For example, processor 220 may determine an average time interval measure $P_{ave}$ representing an average time interval between frames received during a predetermined time period T, for example.

User device 160 determines a unique number of user devices that are currently using the base station 120 based on information in the frames transmitted by the base station (step 520). Referring to FIG. 4B, processor 220 may examine the assignment of subchannels within DL-MAP field 410 to identify one or more user devices that are currently using the base station 120. Based on the information within DL-MAP field 410, user device 160 determines a number of unique user devices $Q_U$ that are currently using the base station 120. In another embodiment, user device 160 may examine subchannel assignment information within UL-MAP field 445 to identify user devices that are currently using a base station. Alternatively, user device 160 may examine the information in DL-MAP field 410 and the information in UL-MAP field 445 to identify user devices that are currently using a base station 120.

User device 160 also determines a subframe utilization value R indicating a portion of subframes within a cellular frame transmitted by the base station 120 that are currently being used. For example, processor 220 may determine the subframe utilization value R by dividing the number of subframes within DL-MAP field 410 that are currently being used to transmit information by the total number of subframes within DL-MAP field 410.

User device 160 determines a load measure associated with the base station, based at least on the number of unique user devices associated with the base station and the time interval measure (step 530). For example, processor 220 may calculate a load measure associated with a particular base station based on the average time interval measure $P_{ave}$ between frames transmitted by the particular base station, the number of unique user devices $Q_U$ that are using the particular base station, and the subframe utilization value R, in accordance with the following formula:

$$\text{Base Station Load}=(Q_U)(R)/P_{ave}$$

In an alternative embodiment, user device 160 may determine a first load measure corresponding to a base station's download link control channel, and a second load measure corresponding to the base station's upload link control channel.

In accordance with an embodiment, user device 160 uses methods described above to determine a respective load measure for each a plurality of base stations 120. User device 160 selects a base station 120 having the lowest load measure, and connects to the selected base station 120. In this manner, user device 160 provides optimal cellular connectivity capability to the user.

In accordance with another embodiment, user device 160 uses methods described above to determine respective load measures for one or more access points 115, and respective load measures for one or more base stations 120. User device 160 compares the load measures of the access point(s) and base station(s) and selects a node (access point or base station) having the lowest load measure, and connects to the selected node. In this manner, user device 160 provides optimal connectivity capability to the user.

In another embodiment, user device 160 uses the methods described above to determine respective load measures for a plurality of nodes and presents the nodes and the corresponding load measures to the user, for example, on display 270 (shown in FIG. 2). User device 160 may then allow the user to select a node from among the nodes presented. When a selection of a node is received from the user, user device 160 connects to the selected node.

In accordance with another embodiment, user device 160 may determine a data transmission rate $S_{node}$ (in bits per second, for example) associated with a particular node, for example, by monitoring the observed signal strength of the node's transmission signals. User device 160 may then determine an observed rate-weighted load by determining a product of the node's data transmission rate $S_{node}$ and the load associated with the node, $\text{Load}_{node}$. Accordingly, a node's rate-weighted load $\text{RWL}_{node}$ is found in accordance with the following formula:

$$\text{RWL}_{node}=(S_{node})(\text{Load}_{node})$$

User device 160 may determine the rate-weighted load values of various nodes and use the results of the comparison as a basis for selecting a node.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining a load associated with a node, the method comprising:
   determining an average time interval measure representing an average time interval between successive frames transmitted by the node via a selected channel;
   determining a number of unique user devices associated with the node based on a destination media access control (MAC) address field in each of the frames transmitted by the node;
   determining a load measure associated with the node, based at least on a value determined by dividing the number of unique user devices associated with the node by the average time interval measure;
   determining a rate-weighted load measure associated with the node by weighting the load measure with a data transmission rate associated with the node determined based on an observed signal strength of transmission signals of the node;
   repeating the steps of determining an average time interval measure, determining a number of unique user devices, determining a load measure, and determining a rate-weighted load measure for a second node associated with the selected channel; and
   selecting a rate-weighted load measure for a Wi-Fi connection with the node, wherein the Wi-Fi connection with the node is selected from among Wi-Fi connections with a plurality of other nodes based on the rate-weighted load measure relative to rate-weighted load measures associated with the plurality of other nodes.

2. The method of claim 1, wherein the node is a Wi-Fi access point, the method further comprising:
   entering a mode enabling receipt any frame transmitted via a selected channel.

3. The method of claim 2, further comprising:
   receiving a frame via the selected channel; and
   identifying the access point based on information in the frame received via the selected channel.

4. The method of claim 2, further comprising:
   identifying one or more addresses based on information in the frames transmitted by the access point; and
   determining a number of user devices associated with the access point based on the addresses.

5. The method of claim 1, further comprising:
   examining frames transmitted by the access point via the selected channel during a predetermined period of time.

6. The method of claim 5, wherein the time interval measure represents an average time interval between the frames transmitted by the node during the predetermined period of time.

7. The method of claim 1, further comprising:
   repeating the steps of determining a time interval measure, determining a number of user devices, and determining a load measure, for a second access point associated with the selected channel; and
   joining a selected access point having a lowest load measure.

8. The method of claim 1, further comprising:
   identifying a second access point associated with a second channel; and repeating the steps of determining a time interval measure, determining a number of user devices, and determining a load measure, for the second access point; and
joining a selected access point having a lowest load measure.

9. The method of claim 1, wherein the node is a cellular base station,
the method further comprising:
determining a subframe utilization value representing a rate of utilization of subframes within the frames transmitted by the base station; and
determining the load measure associated with the base station based on the number of user devices associated with the base station, the time interval measure, and the subframe utilization value.

10. The method of claim 9, further comprising:
receiving a control frame via a common control channel associated with the base station;
examining at least one of a downlink map field and an uplink map field in the control frame;
identifying one or more user devices based on data in at least one of the downlink map field and the uplink map field; and
determining the subframe utilization rate based on information in at least one of the downlink map field and the uplink map field.

11. The method of claim 9, wherein the time interval measure represents an average time interval between frames transmitted by the base station during a predetermined period of time.

12. The method of claim 9, further comprising:
determining the load measure by determining a product of the number of user devices associated with the base station and the subframe utilization rate, and dividing the product by the time interval measure.

13. The method of claim 9, further comprising:
repeating the steps of determining a time interval measure, determining a number of user devices, determining a subframe utilization value, and determining a load measure, for a second base station; and
establishing a communication connection with a selected base station having a lowest load measure.

14. The method of claim 1, further comprising:
determining the data transmission rate associated with the node.

15. A non-transitory computer readable medium having program instructions stored thereon, the instructions capable of execution by a processor and defining the steps of:
determining an average time interval measure representing an average time interval between successive frames transmitted by the node via a selected channel;
determining a number of unique user devices associated with the node based on a destination media access control (MAC) address field in each of the frames transmitted by the node;
determining a load measure associated with the node, based at least on a value determined by dividing the number of unique user devices associated with the node by the average time interval measure;
determining a rate-weighted load measure associated with the node by weighting the load measure with a data transmission rate associated with the node determined based on an observed signal strength of transmission signals of the node;
repeating the steps of determining an average time interval measure, determining a number of unique user devices, determining a load measure, and determining a rate-weighted load measure for a second node associated with the selected channel; and
selecting a rate-weighted load measure for a Wi-Fi connection with the node, wherein the Wi-Fi connection with the node is selected from among Wi-Fi connections with a plurality of other nodes based on the rate-weighted load measure relative to rate-weighted load measures associated with the plurality of other nodes.

16. The non-transitory computer readable medium of claim 15, wherein the node is a Wi-Fi access point, the non-transitory computer readable medium further comprising instructions defining the steps of:
receiving a frame via a selected channel; and
identifying the access point based on information in the frame.

17. The non-transitory computer readable medium of claim 16, further comprising instructions defining the steps of:
identifying one or more addresses based on the information in the frames transmitted by the access point; and
determining the number of user devices associated with the access point based on the one or more addresses.

18. The non-transitory computer readable medium of claim 16, further comprising instructions defining the step of:
examining a plurality of frames transmitted by the access point via the selected channel during a predetermined period of time.

19. The non-transitory computer readable medium of claim 15, wherein the node is a cellular base station, the non-transitory computer readable medium further comprising instructions defining the steps of:
determining a subframe utilization value representing a rate of utilization of subframes within the frames transmitted by the base station; and
determining the load measure associated with the base station based on the number of user devices associated with the base station, the time interval measure, and the subframe utilization value.

20. The non-transitory computer readable medium of claim 19, further comprising instructions defining the steps of:
examining a downlink map field in at least one of the frames transmitted by the base station; and
determining the subframe utilization value based on data in the downlink map field.

21. The non-transitory computer readable medium of claim 19, further comprising instructions defining the step of:
determining the load measure by determining a product of the number of user devices associated with the base station and the subframe utilization rate, and dividing the product by the time interval measure.

22. A device comprising:
an antenna configured to:
receive a plurality of frames transmitted by a node; and
a processor configured to:
determine an average time interval measure representing an average time interval between successive frames transmitted by the node via a selected channel;
determine a number of unique user devices associated with the node based on a destination media access control (MAC) address field in each of the frames transmitted by the node;
determine a load measure associated with the node, based at least on a value determined by dividing the number of unique user devices associated with the node by the average time interval measure;
determine a rate-weighted load measure associated with the node by weighting the load measure with a data transmission rate associated with the node determined based on an observed signal strength of transmission signals of the node;

repeat the steps of determining an average time interval measure, determining a number of unique user devices, determining a load measure, and determining a rate-weighted load measure for a second node associated with the selected channel; and select a rate-weighted load measure for a Wi-Fi connection with the node, wherein the Wi-Fi connection with the node is selected from among Wi-Fi connections with a plurality of other nodes based on the rate-weighted load measure relative to rate-weighted load measures associated with the plurality of other nodes.

23. The device of claim 22, wherein the node is a Wi-Fi access point, wherein the device is further configured to:

enter a mode that enables the device to receive any frame transmitted via a selected channel.

24. The device of claim 23, wherein the device is further configured to:

receive a frame via the selected channel; and identify the access point based on information in the frame.

25. The device of claim 22, wherein the node is a cellular base station, wherein the device is further configured to:

determine a subframe utilization value representing a rate of utilization of subframes within frames transmitted by the base station; and determine the load measure associated with the base station based on the number of user devices associated with the base station, the time interval measure, and the subframe utilization value.

* * * * *